US012564131B2

(12) United States Patent
Cong et al.

(10) Patent No.: US 12,564,131 B2
(45) Date of Patent: Mar. 3, 2026

(54) SHIELDING STRUCTURE FOR CAMERA AND MOWER

(71) Applicants: Suzhou Cleva Precision Machinery & Technology Co, Ltd, Suzhou (CN); Skybest Electric Appliance (Suzhou) Co., Ltd., Suzhou (CN)

(72) Inventors: Wang Cong, Suzhou (CN); Zhang Chen, Suzhou (CN)

(73) Assignees: Suzhou Cleva Precision Machinery & Technology Co., Ltd., Suzhou (CN); Skybest Electric Appliance (Suzhou) Co., Ltd., Suzhou (CN)

( * ) Notice: Subject to any disclaimer, the term of this patent is extended or adjusted under 35 U.S.C. 154(b) by 296 days.

(21) Appl. No.: 18/465,567

(22) Filed: Sep. 12, 2023

(65) Prior Publication Data

US 2024/0081176 A1      Mar. 14, 2024

(30) Foreign Application Priority Data

Sep. 13, 2022      (CN) .......................... 202222421878.5

(51) Int. Cl.
A01D 34/00          (2006.01)
B60R 11/04          (2006.01)
                (Continued)

(52) U.S. Cl.
CPC .......... A01D 34/008 (2013.01); G03B 11/045 (2013.01); G03B 29/00 (2013.01);
                (Continued)

(58) Field of Classification Search
CPC .... A01D 34/00; A01D 34/006; A01D 34/008; H04N 23/50; H04N 23/51; H04N 23/52;
                (Continued)

(56) References Cited

U.S. PATENT DOCUMENTS

D637,640 S        5/2011  Park et al.
12,401,870 B2 *   8/2025  Cui ...................... G03B 11/045
                (Continued)

FOREIGN PATENT DOCUMENTS

CN        105759539 A  *  7/2016  ............. H04N 23/51
EP        2286653 A2 *   2/2011  ........... A01D 34/008
EP        3355288 A1     8/2018

OTHER PUBLICATIONS

EP Search Report dated Feb. 14, 2024, for EP Application No. 23186656.

(Continued)

*Primary Examiner* — Twyler L Haskins
*Assistant Examiner* — Akshay Trehan
(74) *Attorney, Agent, or Firm* — JK Intellectual Property Law, PA

(57)          ABSTRACT

A shielding structure is disposed around a camera of a mower, in a front of a forward direction of the mower. The shielding structure includes a first shielding plate, a second shielding plate, and a third shielding plate. The shielding plates from a lens surface of the camera. The first shielding plate is disposed above the camera to shield sunlight from a top of the camera. The second and third shielding plates are disposed on two sides of the camera to shield sunlight from the two sides of the camera. The shielding plates may be formed unitarily or separately, and they may be removably and/or retractably attached to the mower. The shielding plates may be arranged so that the shielding structure flares outwardly in the downward direction.

3 Claims, 2 Drawing Sheets

(51) Int. Cl.

| | |
|---|---|
| *G03B 11/04* | (2021.01) |
| *G03B 17/56* | (2021.01) |
| *G03B 29/00* | (2021.01) |
| *G03B 30/00* | (2021.01) |
| *H04N 23/51* | (2023.01) |
| *H04N 23/52* | (2023.01) |
| *H04N 23/54* | (2023.01) |
| *H04N 23/55* | (2023.01) |
| *H04N 23/57* | (2023.01) |

(52) U.S. Cl.
CPC ............. *H04N 23/51* (2023.01); *H04N 23/52* (2023.01); *H04N 23/54* (2023.01); *H04N 23/55* (2023.01); *H04N 23/57* (2023.01); *B60R 11/04* (2013.01); *G03B 17/561* (2013.01); *G03B 17/566* (2013.01); *G03B 30/00* (2021.01)

(58) Field of Classification Search
CPC ........ H04N 23/54; H04N 23/55; H04N 23/57; G03B 11/00; G03B 11/02; G03B 11/04; G03B 11/045; G03B 29/00; G03B 17/02; G03B 17/561; G03B 17/566; G03B 30/00; B60R 11/04
See application file for complete search history.

(56) References Cited

U.S. PATENT DOCUMENTS

| | | | | |
|---|---|---|---|---|
| 2005/0169628 A1* | 8/2005 | Zhang | ................. | G03B 11/041 |
| | | | | 396/529 |
| 2007/0268588 A1* | 11/2007 | Elias | .................... | G03B 11/045 |
| | | | | 359/611 |
| 2018/0125003 A1* | 5/2018 | Wu | ...................... | G06V 10/462 |
| 2018/0211498 A1* | 7/2018 | Chen | ...................... | H04N 23/55 |
| 2021/0180784 A1* | 6/2021 | Leblanc | ................ | F21V 23/045 |
| 2024/0056659 A1* | 2/2024 | Cui | ......................... | G03B 17/02 |

OTHER PUBLICATIONS

Response to Search Report dated Aug. 21, 2024, for EP Application No. 23186656.

Supplemental EP Search Report dated Jul. 15, 2025, for EP Application No. 23186656.

Response to Search Report dated Oct. 27, 2025, for EP Application No. 23186656.

\* cited by examiner

SHIELDING STRUCTURE FOR CAMERA AND MOWER

CROSS-REFERENCE TO RELATED APPLICATIONS

This application claims benefit of Chinese Application No. 202222421878.5, filed on Sep. 13, 2022, which is incorporated by reference herein.

TECHNICAL FIELD

The present disclosure relates to the technical field of mowers, in particular to a shielding structure for a camera and a mower.

BACKGROUND

In the prior art, a mowing robot needs to work outdoors for a long time. A camera disposed on the robot takes photos to identify whether the robot is in a lawn, such that the robot makes corresponding actions. However, the existing camera has no effective shielding protection structure, such that sunlight directly shines on a lens of the camera, which not only produces glare to affect the quality and clarity of photos and subsequent photo processing by the robot, but also causes damage to components such as aperture blades of the lens of the camera.

SUMMARY

The technical problem to be solved by embodiments of the present disclosure is to provide a shielding structure for a camera, which can avoid direct sunlight on the camera, improve the quality and clarity of photos taken by the camera, and prolong the service life of the camera.

In order to solve the above technical problem, the present disclosure provides a shielding structure for a camera. The shielding structure for a camera is disposed around a camera of a mower, and is located in the front of a forward direction of the mower; and the shielding structure for a camera includes a first shielding plate, a second shielding plate and a third shielding plate; the first shielding plate, the second shielding plate and the third shielding plate protrude from a lens surface of the camera, and the first shielding plate is disposed above the camera to shield sunlight from the top of the camera; and the second shielding plate and the third shielding plate are disposed on two sides of the camera to shield sunlight from the two sides of the camera.

In a feasible implementation, two sides of the first shielding plate are connected with the second shielding plate and the third shielding plate respectively; and the first shielding plate, the second shielding plate and the third shielding plate are integrated.

In a feasible implementation, the first shielding plate, the second shielding plate and the third shielding plate are split and connected with the mower respectively.

In a feasible implementation, the shielding structure is detachably connected to the mower.

In a feasible implementation, the shielding structure for a camera is fixed to the mower by clamping or sliding connection.

In a feasible implementation, the second shielding plate and the third shielding plate are inclined with respect to the first shielding plate, and distances from the second shielding plate and the third shielding plate close to the first shielding plate are shorter than those far away from the first shielding plate.

In a feasible implementation, a first angle is formed between the second shielding plate and the first shielding plate, and is between 90° and 180°; and a second angle is formed between the third shielding plate and the first shielding plate, and is between 90° and 180°.

In a feasible implementation, the first shielding plate, the second shielding plate and the third shielding plate are retractable to adjust a shielding area.

In a feasible implementation, the second shielding plate and the third shielding plate are provided with anti-slip strips.

Correspondingly, a second aspect of the present disclosure further provides a mower, including the shielding structure for a camera described in the first aspect of the present disclosure.

The implementation of the present disclosure achieves the following beneficial effects:

The shielding structure for a camera, provided in the present application, is disposed around the camera of a mower, the shielding structure includes a first shielding plate, a second shielding plate and a third shielding plate, the first shielding plate shields sunlight from the top of the camera, and the second shielding plate and the third shielding plate shield sunlight from the two sides of the camera, which can avoid direct sunlight on the camera, so as to improve the quality and clarity of photos taken by the camera and facilitate subsequent processing by the mower. In addition, a lens of the camera does not need to be exposed to sunlight for a long time, which can prolong the service life of the camera.

Further, the shielding structure may be integrated or split and is detachable. When the shielding structure is aging due to long-time exposure to sunlight, the entire shielding structure or corresponding shielding plates can be directly replaced, thereby prolonging the service life of the camera.

It should be understood that the above general descriptions and the following detailed descriptions are exemplary and explanatory only, and are not intended to limit the present application.

BRIEF DESCRIPTION OF THE DRAWINGS

Accompanying drawings herein are incorporated into the description and constitute a part of the description, show embodiments in accordance with the present application, are used to explain the principle of the present application together with the description, and do not constitute improper limitations to the present application.

Figure 1:
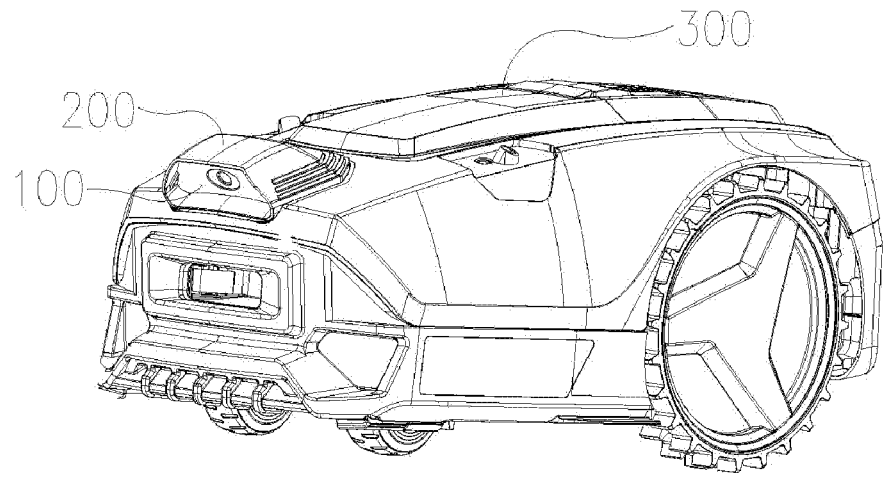
FIG. 1 is an isometric connection structure diagram of a shielding structure for a camera and a mower according to the present disclosure.

Reference numerals used in the drawings: 100—camera, 200—shielding structure, 201—first shielding plate, 202— second shielding plate, 203—third shielding plate, 204—anti-slip strip, and 300—mower.

DETAILED DESCRIPTION OF THE EMBODIMENTS

In order to make the above objectives, features and advantages of the present disclosure more obvious and understandable, specific embodiments of the present disclosure will be described in detail below with reference to the accompanying drawings. Many specific details are described in the following description to fully understand the present disclosure. However, the present disclosure can be implemented in many ways different from those described herein. Those skilled in the art can make similar improvements without violating the content of the present disclosure. Therefore, the present disclosure is not limited by the specific embodiments disclosed below.

It should be noted that when one element is referred to as being "fixed" to another element, the element may be directly located on the other element, or a medium element may exist. When one element is considered to be "connected" to another element, the element may be directly connected to the other element, or a medium element may exist simultaneously. The terms "vertical", "horizontal", "left", "right" and the like used herein are only for the purpose of illustration.

Unless otherwise defined, all technological and scientific terms used herein have the same meanings as commonly understood by those skilled in the technical field of the present disclosure. The terms used in the description of the present disclosure are only for the purpose of describing specific embodiments, but are not intended to limit the present disclosure. The term "and/or" used herein includes any and all combinations of one or more relevant listed items.

Figure 4:
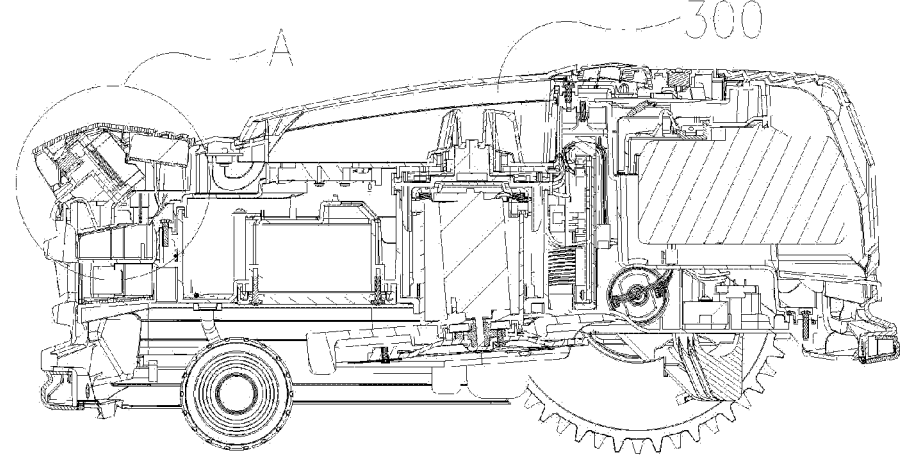
FIG. 4 is a sectional view of a mower according to the present disclosure.
Figure 5:
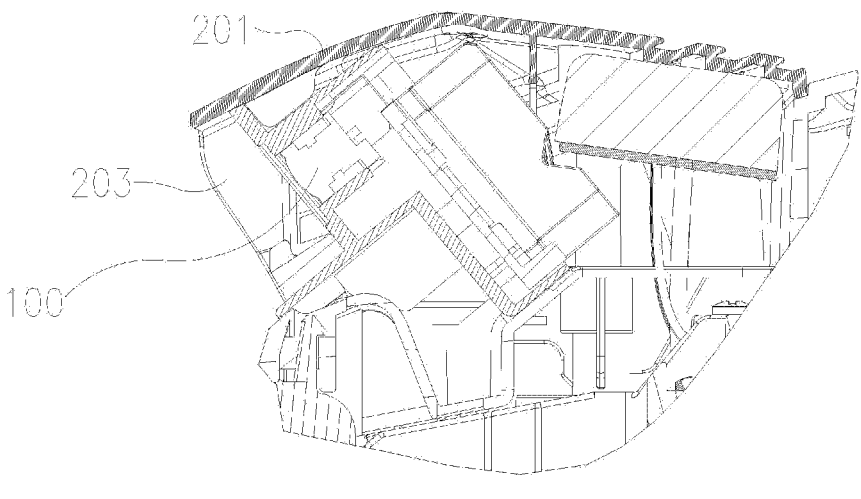
FIG. 5 is a schematic enlarged view of part A in FIG. 4.

As shown in FIGS. 1, 4 and 5, this embodiment provides a shielding structure for a camera. The shielding structure 200 for a camera is disposed around a camera 100 of a mower 300, and is located in the front of a forward direction of the mower 300. The shielding structure 200 for a camera includes a first shielding plate 201, a second shielding plate 202 and a third shielding plate 203. The first shielding plate 201, the second shielding plate 202 and the third shielding plate 203 protrude from a lens surface of the camera 100. The first shielding plate 201 is disposed above the camera 100 to shield sunlight from the top of the camera 100; and the second shielding plate 202 and the third shielding plate 203 are disposed on two sides of the camera 100 to shield sunlight from the two sides of the camera 100. It should be noted that the drawings only show that the second shielding plate 202 is located on a left side of the forward direction of the mower 300, and the third shielding plate 203 is located on a right side of the forward direction of the mower 300, but the positions of the second shielding plate 202 and the third shielding plate 203 may be changed, that is, the second shielding plate 202 is located on the right side of the forward direction of the mower 300, and the third shielding plate 203 is located on the left side of the forward direction of the mower 300.

In a possible implementation, the camera 100 is located in the front of the forward direction of the mower 300, and the shielding structure 200 is disposed around the camera 100. When the mower 300 is mowing, the shielding structure 200 can shield sunlight from the top and two sides of the camera 100, so as to avoid long-time direct sunlight on the camera 100 that causes the camera 100 to produce glare when taking photos to affect the quality and clarity of the photos, and to avoid damage to a lens of the camera 100 exposed to sunlight for a long time. The shielding structure 200 includes a first shielding plate 201, a second shielding plate 202 and a third shielding plate 203. In order that the shielding structure 200 can achieve a better sunshade effect, the first shielding plate 201, the second shielding plate 202 and the third shielding plate 203 need to protrude from the lens surface of the camera 100, and the first shielding plate 201, the second shielding plate 202 and the third shielding plate 203 need not shield the lens of the camera 100, which can meet a requirement of normal shooting of the camera 100 for brightness.

Figure 2:
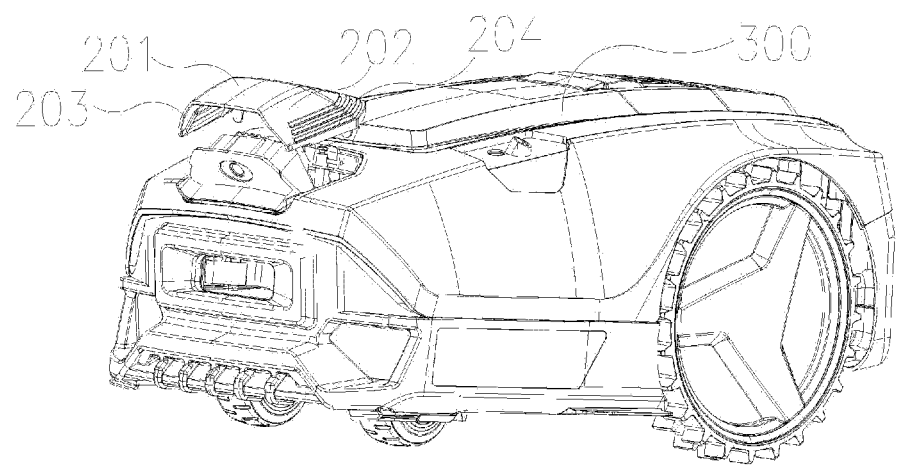
FIG. 2 is a first isometric schematic disassembly diagram of a shielding structure for a camera and a mower according to the present disclosure.
Figure 3:
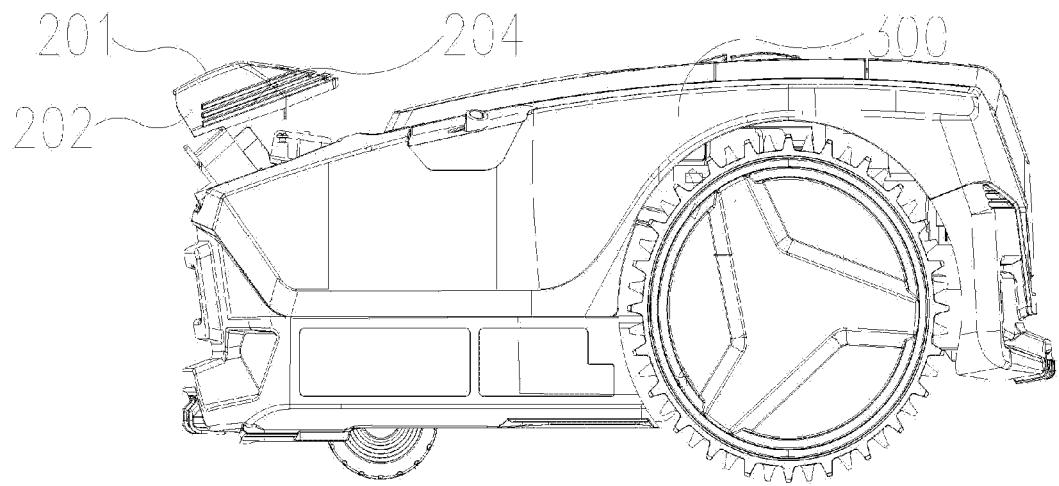
FIG. 3 is a second side schematic disassembly diagram of a shielding structure for a camera and a mower according to the present disclosure.

In a possible implementation, as shown in FIGS. 2 and 3, two sides of the first shielding plate 201 are connected with the second shielding plate 202 and the third shielding plate 203 respectively, which can shield the sunlight from the top and two sides of the camera 100 more comprehensively. The second shielding plate 202 and the third shielding plate 203 are connected with the first shielding plate 201 respectively, such that the sunlight between the first shielding plate 201 and the second shielding plate 202 and between the first shielding plate 201 and the third shielding plate 203 cannot directly shine on the camera 100. The first shielding plate 201, the second shielding plate 202 and the third shielding plate 203 are integrated to facilitate production. During production, only one mold needs to be produced. In a possible implementation, the shielding structure 200 is detachably connected to the mower 300. When sunlight shines on the shielding structure 200 for a long time to make the shielding structure 200 aging, the integrated shielding structure 200 may be directly detached from the mower 300 and replaced with a new shielding structure 200, which can prolong the service life of the camera 100.

In a possible implementation, the first shielding plate 201, the second shielding plate 202 and the third shielding plate 203 are split and connected with the mower 300 respectively. In a possible implementation, the shielding structure 200 is detachably connected to the mower 300, that is, the first shielding plate 201, the second shielding plate 202 and the third shielding plate 203 are connected with the mower 300 respectively. When any of the shielding plates ages due to direct sunlight, the shielding plate may be replaced separately without replacing all the shielding plates, which can save replacement costs.

In a possible implementation, the shielding structure 200 for a camera is fixed to the mower 300 by clamping or sliding connection. A bulge may be disposed on one of the mower 300 or the shielding structure 200, a groove may be disposed on the other, and the bulge matches the groove, or other clamping modes may also be employed, as long as the shielding structure 200 can be clamped and fixed to the mower 300. A slide rail may alternatively be disposed on one of the mower 300 or the shielding structure 200, and a slider may be disposed on the other. The slider can slide along the slide rail, and the slider can finally stay at a position of the slide rail to fix the shielding structure 200 to the mower 300. The shielding structure 200 may also be fixed to the mower 300 by other connection ways besides clamping and sliding connection, as long as the shielding structure 200 can be fixed to the mower 300.

In a possible implementation, the second shielding plate 202 and the third shielding plate 203 are inclined with respect to the first shielding plate 201, and distances from the second shielding plate 202 and the third shielding plate 203 close to the first shielding plate 201 are shorter than those far away from the first shielding plate 201, which may be understood here that the first shielding plate 201, the second shielding plate 202 and the third shielding plate 203 form three edges of a trapezoid, the first shielding plate 201 is an upper bottom of the trapezoid, and the second shielding plate 202 and the third shielding plate 203 are waists of the trapezoid, which can increase a shooting angle range of the camera 100 and enable the camera 100 to capture more working areas. In a possible implementation, a first angle is formed between the second shielding plate 202 and the first shielding plate 201, and is between 90° and 180°; and a second angle is formed between the third shielding plate 203 and the first shielding plate 201, and is between 90° and 180°. The values of the first angle and the second angle may be equal or unequal, and may be determined according to the intensity of sunlight when the mower 300 is working.

In a possible implementation, the first shielding plate 201, the second shielding plate 202 and the third shielding plate 203 are retractable to adjust a shielding area. The first shielding plate 201 may adjust the height of the lens protruding from the camera 100 to adjust the intensity of the sunlight from the top of the camera 100. The second shielding plate 202 and the third shielding plate 203 may adjust the height of the lens protruding from the camera 100 to adjust the intensity of the sunlight from the two sides of the camera 100, and lengths of the second shielding plate 202 and the third shielding plate 203 in a longitudinal direction may also be adjusted. When the sunlight from one side of the second shielding plate 202 is strong, the second shielding plate 202 may be stretched to increase the shielding area. When the sunlight from one side of the third shielding plate 203 is strong, the third shielding plate 203 may be stretched to increase the shielding area. Similarly, when the sunlight on one side is weak, the corresponding shielding plate may be retracted to reduce the shielding area and provide sufficient illumination for the camera 100.

In a possible implementation, as shown in FIGS. 2 and 3, the second shielding plate 202 and the third shielding plate 203 are provided with anti-slip strips 204, and the anti-slip strips 204 are disposed around outer surfaces, away from the camera 100, of the second shielding plate 202 and the third shielding plate 203. When the shielding structure 200 needs to be replaced, the anti-slip strips 204 can increase friction between an operator and the shielding structure 200, so as to help the operator to detach the old shielding structure 200 for replacing with a new shielding structure 200.

This embodiment further provides a mower 300, including the shielding structure 200 for a camera in the foregoing embodiment. The shielding structure 200 solves a problem of direct sunlight on the camera 100, greatly improves the quality of photos taken by the camera 100, further ensures work safety of the mower 300 on a working surface, and also avoids damage to the lens of the camera 100 exposed to the sunlight for a long time.

The technical features of the foregoing embodiments may be combined arbitrarily. For the purpose of simplicity in description, all possible combinations of the technical features in the foregoing embodiments are not described. However, as long as the combinations of these technical features do not have contradictions, they shall fall within the scope of the description.

The foregoing embodiments only describe several implementations of the present disclosure, and their descriptions are specific and detailed, but cannot therefore be understood as limitations to the patent scope of the present disclosure. It should be noted that those of ordinary skill in the art may further make variations and improvements without departing from the conception of the present disclosure, and these all fall within the protection scope of the present disclosure. Therefore, the protection scope of the present disclosure shall be subject to the appended claims.

The invention claimed is:

1. A lawn mowing device comprising:
   a mower having a front and a back, the mower being a robotic mower drivable in a forward direction extending from the back toward the front;
   a camera located at the front of the mower pointing in the forward direction;
   a shielding structure disposed around the camera, the shielding structure including a first shielding plate, a second shielding plate, and a third shielding plate, the first shielding plate being located between the second shielding plate and the third shielding plate, the second shielding plate and the third shielding plate each extending distally from the first shielding plate outwardly inclined such that a distance between the second shielding plate and the third shielding plate closer to the first shielding plate is shorter than a distance between the second shielding plate and the third shielding plate further away from the first shielding plate;
   the first shielding plate, the second shielding plate, and the third shielding plate each being configured as separate components, each being detachably connected to the mower by a clamping or sliding connection, and each protruding relative to a lens surface of the camera so as to define a shielding area to shield the lens surface;
   the first shielding plate being disposed above the camera to shield sunlight from a top of the camera;
   the second shielding plate and the third shielding plate being respectively disposed on opposite sides of the camera to shield sunlight from the opposite sides of the camera; and
   the first shielding plate, the second shielding plate, and the third shielding plate being are retractable relative to the mower to adjust the shielding area.

2. The device according to claim 1, wherein a first angle is formed between the second shielding plate and the first shielding plate, the first angle being between 90° and 180°; and
   a second angle is formed between the third shielding plate and the first shielding plate, the second angle being between 90° and 180°.

3. The device according to claim 1, wherein the second shielding plate and the third shielding plate include anti-slip strips.

\* \* \* \* \*